United States Patent [19]

Cardone et al.

[11] Patent Number: 4,956,625
[45] Date of Patent: Sep. 11, 1990

[54] MAGNETIC GRIPPING APPARATUS HAVING CIRCUIT FOR ELIMINATING RESIDUAL FLUX

[75] Inventors: Michele Cardone; Angelo Grandini; Bruno Zaramella, all of Milan, Italy

[73] Assignee: Tecnomagnete S.p.A., Milano, Italy

[21] Appl. No.: 357,342

[22] Filed: May 26, 1989

[30] Foreign Application Priority Data

Jun. 10, 1988 [IT] Italy .................. 20943 A/88

[51] Int. Cl.⁵ .................................. H01F 7/20
[52] U.S. Cl. .......................... 335/290; 335/295
[58] Field of Search ............ 335/285, 295, 289, 290, 335/294

[56] References Cited

U.S. PATENT DOCUMENTS

| | | |
|---|---|---|
| 675,323 | 5/1901 | Clark .................................. 335/290 |
| 2,213,007 | 8/1940 | Karasick . |
| 2,445,459 | 7/1948 | Snyder . |
| 3,740,683 | 6/1973 | Benson ........................... 335/289 X |
| 3,978,441 | 8/1976 | Sobottka et al. ............... 335/289 X |
| 4,015,174 | 3/1977 | Cotton de Bennetot . |
| 4,141,547 | 2/1979 | Duquenne et al. . |
| 4,847,582 | 7/1989 | Cardone et al. ................... 335/290 |

OTHER PUBLICATIONS

Abstract of Japan Appl. 58-186910 "Magnetic Attracting Apparatus", Vol. 8 Number 25 (E-225) Feb. 2, 1984.

Primary Examiner—George Harris
Attorney, Agent, or Firm—Beveridge, DeGrandi & Weilacher

[57] ABSTRACT

A magnetic gripping apparatus, of the permanent magnet type, comprising a base plate and peripheral walls, at least a first and a second pole units, each pole unit comprising a main pole piece having an outer face defining a gripping surface, main permanent magnets arranged between said main pole pieces and said base plate, an intermediate pole member between said first and second pole units, said intermediate pole member extending from the base plate to the gripping surface and secondary magnets between the pole members and the pole pieces; a first electrical windings encircles each main magnet, said electrical winding being operatively conected to a control unit, and a residual flux eliminating circuit comprising a second electrical winding encircling said intermediate pole member, said second winding being operatively connected to a demagnetizing control unit.

6 Claims, 2 Drawing Sheets

MAGNETIC GRIPPING APPARATUS HAVING CIRCUIT FOR ELIMINATING RESIDUAL FLUX

BACKGROUND OF THE INVENTION

This invention refers to a magnetic gripping apparatus to be used both for anchoring workpieces to machine tools and for hoisting and similar apparatus.

Magnetic gripping devices or apparatuses of flux reversal type are generally known in which a magnetic circuit is activated and de-activated by reversing the magnetization of part of the permanent magnets of the device. For example, from U.S. Pat. Nos. 4,090,162 and 4,356,467 by the same inventors it is known to provide magnetic gripping devices comprising a base plate, peripheral walls and pole units having main pole pieces defining a work-holding or gripping surface, in which the pole pieces are energized by reversible permanent magnets positioned between each main pole member and the base plate and by secondary permanent magnets disposed between the intermediate pole members and said main pole pieces, said secondary magnets being magnetized so as to present a pole of the same polarity to a corresponding pole member, and in which the reversible magnets are encircled by flux reversal coils of a first electric circuit connected to a control unit for activating and de-activating the device.

It is likewise known that in high-alloy workpieces magnetically anchored by using devices of the above-mentioned type, upon deactivation there exist a magnetic remanence which extends to hold the workpiece gripped even after the device has been de-activated, the relevant gripping force being determined by the dimensions of the workpiece as well as by the same magnetic remanence. Clearly, in certain applications, especially on grinders and hoisting apparatus the presence of a magnetic remanence in the workpiece is a disadvantage since it prevents the detachment of the workpiece and hampers the progress of normal working, or sometimes causes damage to the surfaces already machined if, in order to be removed, the workpiece has to be slid or dragged against the gripping surface. This magnetic remanence can not be removed in existing devices due to the impossibility of using activating/de-activating circuits to establish a magnetic field for totally demagnetizing the workpieces, because the same magnetic circuit would inevitably be damaged as a result.

An object of this invention is to provide a magnetic gripping device of the above-mentioned type comprising means for totally demagnetizing the gripped workpiece so that any magnetic remanence in the workpiece is entirely nullified following de-activation of the gripping device.

Another object of this invention is to provide a magnetic device, as define above, in which demagnetization of the workpiece can be achieved without interfering with or damaging the permanent magnets of the main activating circuit.

A further object of this invention is to provide a magnetic gripping device in which use is made of an appropriate auxiliary workpiece-demagnetiszng circuit, which makes use of part of main magnetic circuit of the device without damaging the permanent magnets and which at the same time does not necessitate an increase in the size or overall dimensions.

SUMMARY OF THE INVENTION

According to the invention the device for gripping ferromagnetic workpieces comprises: a base plate, peripheral walls and at least a first and a second hole unit in which each pole unit comprises a main pole piece having an outer face defining a gripping surface, and main permanent magnet arranged between said main pole piece and the base plate; an intermediate pole member between the pole pieces of said pole units, said intermediate pole member extending from the base plate to the gripping surface, and secondary magnets disposed between said pole member and said pole pieces, the device further comprising first electrical windings encircling said main magnets and operatively connected to a control unit to activate e deactivate the device, and a demagnetizing circuit for eliminating residual flux or remanence in the workpieces, said demagnetizing circuit comprising a demagnetizing winding or coil encircling the above-mentioned intermediate pole member and a demagnetizing control unit to generate a progessively decreasing demagnetizing cyclical field in said intermediate pole member and between the workpiece and said base plate.

In a device comprising several pole units and corresponding intermediate pole members, the demagnetizing coils for eliminating the magnetic remanence in the workpieces may be energized by, or wound around corresponding pole members so as to cause a reversed circulation of the current pulses during the demagnetization cycle, so that the magnetic fluxes in the relevant pole members alternatively have mutually opposing magnetic directions. In addition the advantage is offered of positioning the coils of the demagnetization circuit above or below the secondary permanent magnets of the main activation circuit, at the same level and arranged to alternate with the coils of the main circuit, in a fully protected position without increasing the height of the device.

BRIEF DESCRIPTION OF THE DRAWINGS

The device according to the invention will described in greater detail, with reference to the appended drawings in which.

DESCRIPTION OF THE INVENTION

Figure 1:
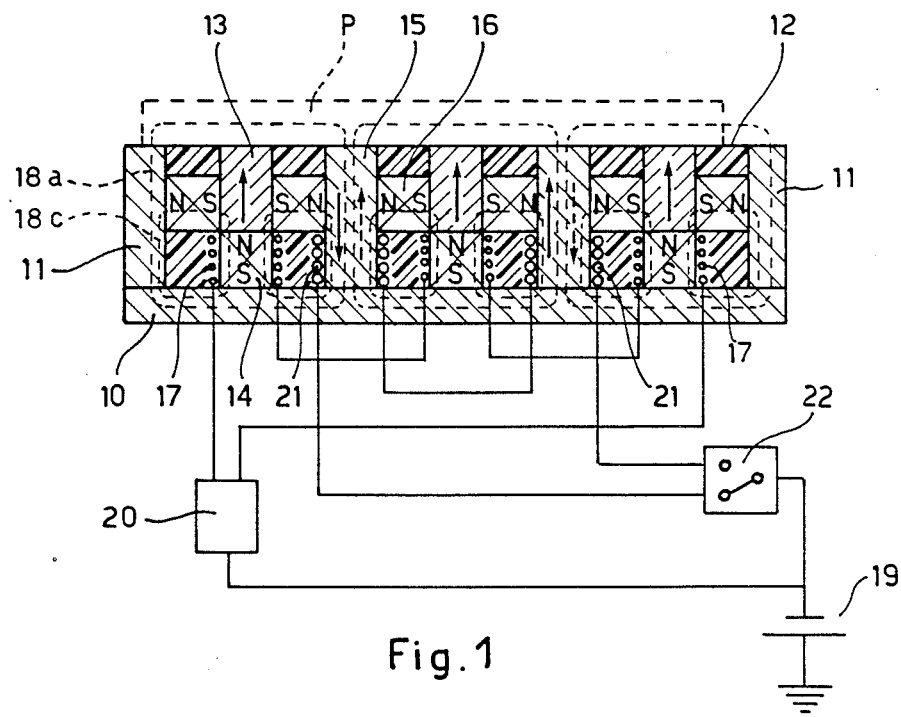
FIG. 1 is a longitudinal cross-sectional view for a first embodiment of a magnetic gripping device, according to the invention, in the de-activated condition, in which the demagnetization flux circulation for eliminating the magnetic remanence in the workpiece is also represented.
Figure 2:
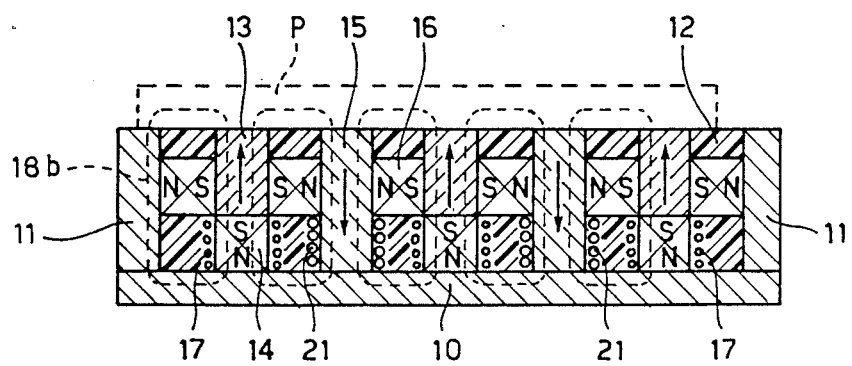
FIG. 2 is a cross-sectional view of the same device in the activated condition.

With reference to FIGS. 1 and 2, the device comprises a base plate 10 and peripheral walls 11 defining a magnetic yoke. Inside the peripheral walls 11, there is provided a plurality of pole units spaced apart and defining a magnetic gripping surface 12 for a workpiece P; each pole unit comprises a main pole piece 13 directly energized by a main permanent magnet 14 which is axially aligned with the pole piece 13, and which is positioned between the latter and the base plate 10; an intermediate pole member 15 is disposed between and spaced apart from the pole pieces 13 of the pole units, the intermediate pole member 15 extending from the base plate 10 to the gripping surface 12. Located in the space between a pole piece 13 and a pole member 15, as well as between the pole pieces 13 and the lateral walls 11 of the yoke are secondary permanent magnets 16 which are permanently magnetized so as to present poles of the same N and S polarity in contact with lateral faces of the pole pieces 13 and pole members 15 mentioned above.

The device also comprises a first activating/de-activating electric circuit essentially comprising flux-inversion coils or windings 17 encircling corresponding reversible magnets 14; the coils 17 are suitably connected in series or in parallel between them in order to provide reversible magnetic fields, such as to cause circulation of magnetic flux within the device as indicated by 18c in the de-activated condition of FIG. 1, or a circulation of the magnetic flux through the worrkpiece or workpieces P to be gripped, as indicated with 18b in the activated condition of FIG. 2. These coils 17 can therefore be operatively connected to a activation-deactivation control unit 20 and electric power source 19.

As previously explained, since in the deactivated condition of the device shown in FIG. 1 the, workpiece P retains a magnetic remanence due to the features of the workpiece as well as to the rate of magnetic flux generated by the device during anchoring or gripping of the workpiece, there is provided, according to the invention, an auxiliary circuit for demagnetizing the workpiece P which may be actuated, after deactivation of the apparatus, to completely eliminate the magnetic remanence in the piece P so that it may be easily removed. This auxiliary circuit accordingly comprises demagnetizing coils 21 each wound around or encircling at least part of a corresponding pole member 15 which is in direct contact with the base plate 10; the coils 21 are suitably fed by current pulses of decreasing values according to usual demagnetizing cycles so that each pole member 15 conveys alternate fluxes of progressively diminishing value, in which the fluxe in one pole member 15 has a reverse direction with respect to the flux of the immediately succeeding polar member 15. In this way alternate poles of opposite polarities are established on the gripping surface 12 in contact with the workpiece P to be demagnetized; these poles give rise to the circulation of a demagnetizing flux 18a in the workpiece P without negatively influencing or interfering with the permanent magnets 14 and 16 for the main activation and de-activation circuit of the apparatus. It may be noted here that the coils 21 or a group of coils 21 can be connected in series, alternately, in opposite winding directions, and the overall assembly of demagnetization coils 21 can be connected to a demagnetizing control unit 22 which can make the magnetic circuit perform complete hysteresis cycles with progressively decreasing flux values until they are nullified when the magnetic remanence in the workpiece P is completely eliminated. In this way the workpiece P can be completely released and removed without difficulty.

The magnetic circuit for demagnetizing the workpieces P must be dimensioned so as to develop an electromagnetic force that is lower than that developed by the main activation circuit or windings 17 providing for example an electromagnetic force between 50% and 70% of that provided by the main circuit. This has the effect of obviating harmful interference with the magnetic flux of the main permanent magnets while still ensuring the workpiece P is efficiently demagnetized.

From what has been stated and illustrated in the appended drawings it is clear that there is provided a magnetic gripping apparatus of the permanent magnet type, capable of being activated and de-activated by reversing the flux of main magnets, said apparatus comprising a secondary electromagnetic circuit acting on a portion of the main magnetic circuit to bring about the total demagnetization of the workpiece P, or the complete elimination of any magnetic remanence, following each de-activation operation, without impairing or compromising the orderly working of the activation circuit. In this way a magnetic apparatus there is provided which is able both to generate a powerful gripping force, by means of permanent magnets, and to eliminate the disadvantages attributable to the presence of residual flux in the workpiece that prevent it from being detached. At the same time the apparatus retains a compact design and limited overall dimensions due to the fact that demagnetizing coils of the secondary circuit are in effect positioned about apart of the pole members in a suitably protected area.

Figure 3:
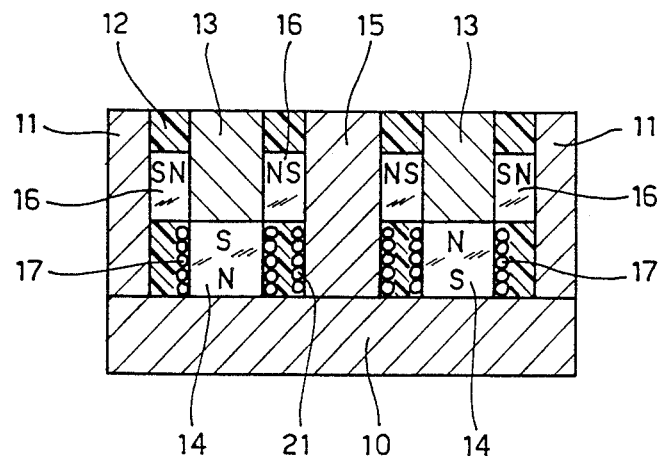
FIG. 3 is a longitudinal cross-sectional view for a second embodiment of the device according to the invention.

FIG. 3 shows another embodiment of the apparatus according to the invention. In the apparatus according to the preceding example, the poles of magnets 14 are similarly oriented in respect to pole pieces 13, therefore the polar pitch between a S pole and a N pole on the gripping surface 12 is fixed and is defined by the distance between the longitudinal axes of a contiguous pole piece 13 and pole member 15, as diagramatically represented in FIG. 2. This is because the poles of the main magnets 14 are all oriented in the same direction.

In the case represented in FIG. 3, where the same reference numbers indicate similar or equivalent parts, the poles of the main magnets are alternatively oriented in opposite directions. Accordingly, in the activated condition of the apparatus the polar pitch will vary, automatically adapting in accordance with the length of the workpiece to grip, as described in EP-A-87110031.9 by the same inventors. This results from the fact that the intermediate pole member 15 can act as a flux conductor or as a "false pole" with respect to the workpiece to be gripped, or as a neutral element, according to whether the workpiece P to be gripped comes in contact solely with one pole piece 13 and with the adjacent pole member 15, or with several pole pieces 13, automatically changing the flux circulation. According to the invention, the variable-pitch apparatus of FIG. 3 is provided with a secondary demagnetization circuit for eliminating magnetic remanence in the gripped workpiece or workpieces, said circuit, as in the preceding case, comprising demagnetizing coil or coils 21 wound around a intermediate pole member or pole members 15; the demagnetizing circuit in the example in FIG. 3 acts entirely like the demagnetization circuit in the previous example.

It is intended that what has been stated and described with reference to transveral pole devices can be applied to any other device of apparatus of the same type without diverging from the innovative principles of this invention.

What is claimed is:

1. A magnetically gripping device for gripping ferromagnetic workpieces, comprising a base plate, peripheral walls and at least a first and second pole unit, each pole unit comprising a main pole piece having an outer face defining a gripping surface, and main permanent magnet arranged between said main pole piece and the base plate; an intermediate pole member being disposed between the main pole pieces of said pole units, said intermediate pole member extending from the base plate to the gripping surface; secondary magnets disposed between said pole member and said pole pieces and between said pole pieces and said peripheral walls the device further comprising first electrical windings encicling said main magnets and operatively connected to a control unit to activate and deactivate the device, in which a demagnetizing circuit for eliminating residual flux or remanence in the workpieces, said demagnetizing circuit comprising a demagnetizing winding encircling the above-mentioned intermediate pole member and a demagnetizing control unit to generate a progressively decreasing demagnetizing cyclical field in said intermediate pole member and between the workpiece to be demagnetized and said base plate.

2. A device as claimed in claim 1, in which the demagnetizing coil is positioned in the space between the secondary permanent magnets and the base plate.

3. A device as claimed in claim 1, in which said first electrical windings of the main magnets and the demagnetizing winding are disposed on the same plane and are all of the same height.

4. A device as claimed in claim 1, in which the demagnetizing winding is positioned around the intermediate pole member in the space between the secondary magnets and the workpiece-gripping surface.

5. A device as claimed in claim 1, in which the workpiece-demagnetizing circuit develops an electromagnetic force of lower value than that generated by the main activation circuit.

6. A device as claimed in claim 5, in which the electromagnetic force generated by the demagnetizing circuit is between 50% and 70% of the value of the force generated in the main circuit.

* * * * *